(12) United States Patent
Liu et al.

(10) Patent No.: US 11,334,133 B2
(45) Date of Patent: May 17, 2022

(54) POWER MANAGEMENT OF VOLTAGE REGULATORS IN AN INFORMATION HANDLING SYSTEM

(71) Applicant: Dell Products L.P., Round Rock, TX (US)

(72) Inventors: Andy Liu, Taoyuan (TW); Gary Charles, Round Rock, TX (US); Merle Jackson Wood, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 176 days.

(21) Appl. No.: 16/858,118

(22) Filed: Apr. 24, 2020

(65) Prior Publication Data
US 2021/0333855 A1  Oct. 28, 2021

(51) Int. Cl.
*G06F 1/28* (2006.01)
*G06F 1/26* (2006.01)
*H02J 7/00* (2006.01)

(52) U.S. Cl.
CPC ............ *G06F 1/28* (2013.01); *G06F 1/263* (2013.01); *H02J 7/00308* (2020.01); *H02J 2207/20* (2020.01)

(58) Field of Classification Search
CPC ........ G06F 1/28; G06F 1/263; H02J 7/00308; H02J 2207/20
See application file for complete search history.

(56) References Cited

U.S. PATENT DOCUMENTS

| | | | | |
|---|---|---|---|---|
| 2006/0238181 A1* | 10/2006 | Luo | .................. | H02M 1/32 323/282 |
| 2013/0278219 A1* | 10/2013 | Yu | .................. | G01R 31/388 320/134 |
| 2014/0062435 A1* | 3/2014 | Lu | .................. | H02J 7/007182 323/282 |
| 2014/0084845 A1* | 3/2014 | Kung | .................. | H02J 7/00712 320/107 |
| 2014/0159644 A1* | 6/2014 | Kung | .................. | H02J 7/00718 320/107 |
| 2014/0229748 A1* | 8/2014 | Li | .................. | G06F 1/28 713/300 |
| 2014/0247005 A1* | 9/2014 | Graham | .................. | H02J 7/342 320/162 |

(Continued)

*Primary Examiner* — Aurel Prifti
(74) *Attorney, Agent, or Firm* — Baker Botts L.L.P.

(57) ABSTRACT

An information handling system including a processor; a battery; a charger module a voltage regulator module connected between the charger module and the processor, the voltage regulator module configured to receive power from the charger module and provide a regulated voltage to the processor; a OVP module configured to determine that the regulated voltage output from the voltage regulator module is above a first threshold, and in response, provide a first signal to the charger module to indicating that the regulated voltage is above the first threshold; a UVP module configured to determine that the charger voltage output from the charger module is below a second threshold, and in response, provide a second signal to the charger module indicating that the charger voltage is below the second threshold, wherein the charger module, in response to receiving both the first signal and the second signal, changes to an off power state.

14 Claims, 7 Drawing Sheets

(56) References Cited

U.S. PATENT DOCUMENTS

| | | | | |
|---|---|---|---|---|
| 2015/0162762 A1* | 6/2015 | Yuan | ............... | H02J 7/008 |
| | | | | 320/109 |
| 2016/0204626 A1* | 7/2016 | Cruz | ............... | H02J 7/00711 |
| | | | | 320/152 |
| 2016/0204631 A1* | 7/2016 | Houston | ............... | H02H 3/202 |
| | | | | 320/162 |
| 2017/0093173 A1* | 3/2017 | Chua | ............... | H02J 7/02 |
| 2017/0255213 A1* | 9/2017 | Oikarinen | ............... | G06F 1/26 |
| 2018/0060201 A1* | 3/2018 | Newberry | ............... | G06F 1/3253 |
| 2018/0188799 A1* | 7/2018 | Nge | ............... | H02J 7/007182 |
| 2018/0316272 A1* | 11/2018 | Yu | ............... | G06F 1/3287 |
| 2018/0323624 A1* | 11/2018 | Chang | ............... | G06F 1/263 |
| 2019/0044322 A1* | 2/2019 | Hijazi | ............... | H02H 7/20 |
| 2019/0097277 A1* | 3/2019 | Fukae | ............... | H02J 7/02 |
| 2020/0052510 A1* | 2/2020 | Yu | ............... | H02J 7/027 |
| 2020/0201408 A1* | 6/2020 | Lehwalder | ............... | G05B 23/0235 |
| 2020/0227933 A1* | 7/2020 | Schiff | ............... | G06F 1/324 |
| 2021/0018971 A1* | 1/2021 | Rotem | ............... | G06F 1/263 |

* cited by examiner

POWER MANAGEMENT OF VOLTAGE REGULATORS IN AN INFORMATION HANDLING SYSTEM

BACKGROUND

Field of the Disclosure

The disclosure relates generally to an information handling system, and in particular, voltage regulators of the information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

To achieve smaller footprints, voltage regulators can use integrated power devices that contain multiple power transistors in a single package. In the event of device failure of the voltage regulator, it is possible for the device to continue to dissipate excessive power into the printed circuit board of the information handling system and surrounding areas such as insulation covers. This can cause overheating, excessive smoke, and/or excessive smell until power is physically removed from the information handling system by the user. However, the power dissipated in the device may not be high enough to burn open the device, nor is the power consumption of the device enough to trip the power source. To stop the smoking situation, the user must remove all power from the information handling system.

SUMMARY

Innovative aspects of the subject matter described in this specification may be embodied in a system including a processor; a battery; a charger module configured to receive power from a power source and to provide a charger voltage to the battery and processor and processor chipset voltage regulators using the power received from the power source to charge the battery; a voltage regulator module connected between the charger module and the processor, the voltage regulator module configured to receive power from the charger module and provide a regulated voltage to the processor; an over voltage protection (OVP) module configured to determine that the regulated voltage output from the voltage regulator module is above a first threshold, and in response, provide a first signal to the charger module to indicating that the regulated voltage is above the first threshold; and an under voltage protection (UVP) module configured to determine that the charger voltage output from the charger module is below a second threshold, and in response, provide a second signal to the charger module indicating that the charger voltage is below the second threshold, wherein the charger module, in response to receiving both the first signal and the second signal, changes to an off power state.

Other embodiments of these aspects include corresponding methods, apparatus, and computer programs, configured to perform the actions of the methods, encoded on computer storage devices.

These and other embodiments may each optionally include one or more of the following features. For instance, the second threshold is based on an operating voltage of the battery. The second threshold is approximately 4.8 volts. The first threshold is approximately 2 volts. The voltage regulator module is a buck voltage regulator. The charger module includes a narrow output voltage DC (NVDC) charger. The voltage regulator module does not receive power when the charger module powers down.

Innovative aspects of the subject matter described in this specification may be embodied in a method including receiving, at a charger module, power from a power source external to the information handling system; providing, by the charger module, a charger voltage to a battery of the information handling system using the power received from the external power source to charge the battery; providing, by a voltage regulator, a regulated voltage to a processor of the information handling system using power received from the external power source; determining that the regulated voltage is above a first threshold, and in response, providing a first signal to the charger module indicating that the regulated voltage is above the first threshold; determining that charger voltage is below a second threshold, and in response, providing a second signal to the charger module indicating that the charger voltage is below the second threshold; and in response to both the first signal and the second signal, changing the charger module to an off power state.

Other embodiments of these aspects include corresponding systems, apparatus, and computer programs, configured to perform the actions of the methods, encoded on computer storage devices.

These and other embodiments may each optionally include one or more of the following features. For instance, the second threshold is based on an operating voltage of the battery. The second threshold is approximately 4.8 volts. The first threshold is approximately 2 volts. The voltage regulator module is a buck voltage regulator. The charger module includes a narrow output voltage DC (NVDC) charger. The voltage regulator module does not receive power when the charger module powers down.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-6 wherein like numbers are used to indicate like and corresponding parts.

Figure 1:
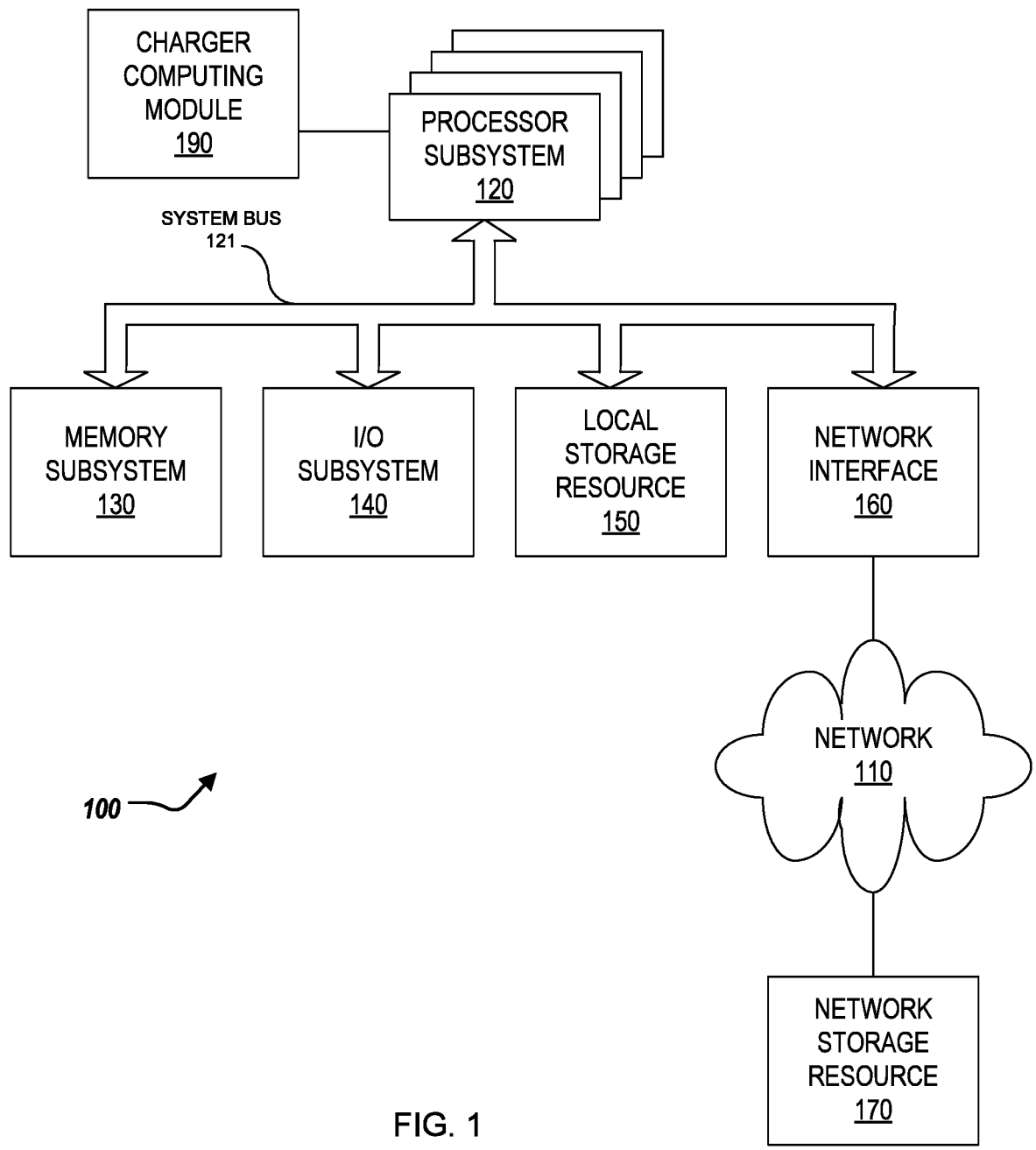
FIG. 1 is a block diagram of selected elements of an embodiment of an information handling system.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can further include a charger computing module 190. For example, the charger computing module 190 can be included by the processor subsystem 120, and/or in communication with the processor subsystem 120. The charger computing module 190 is described further herein.

Figure 2:
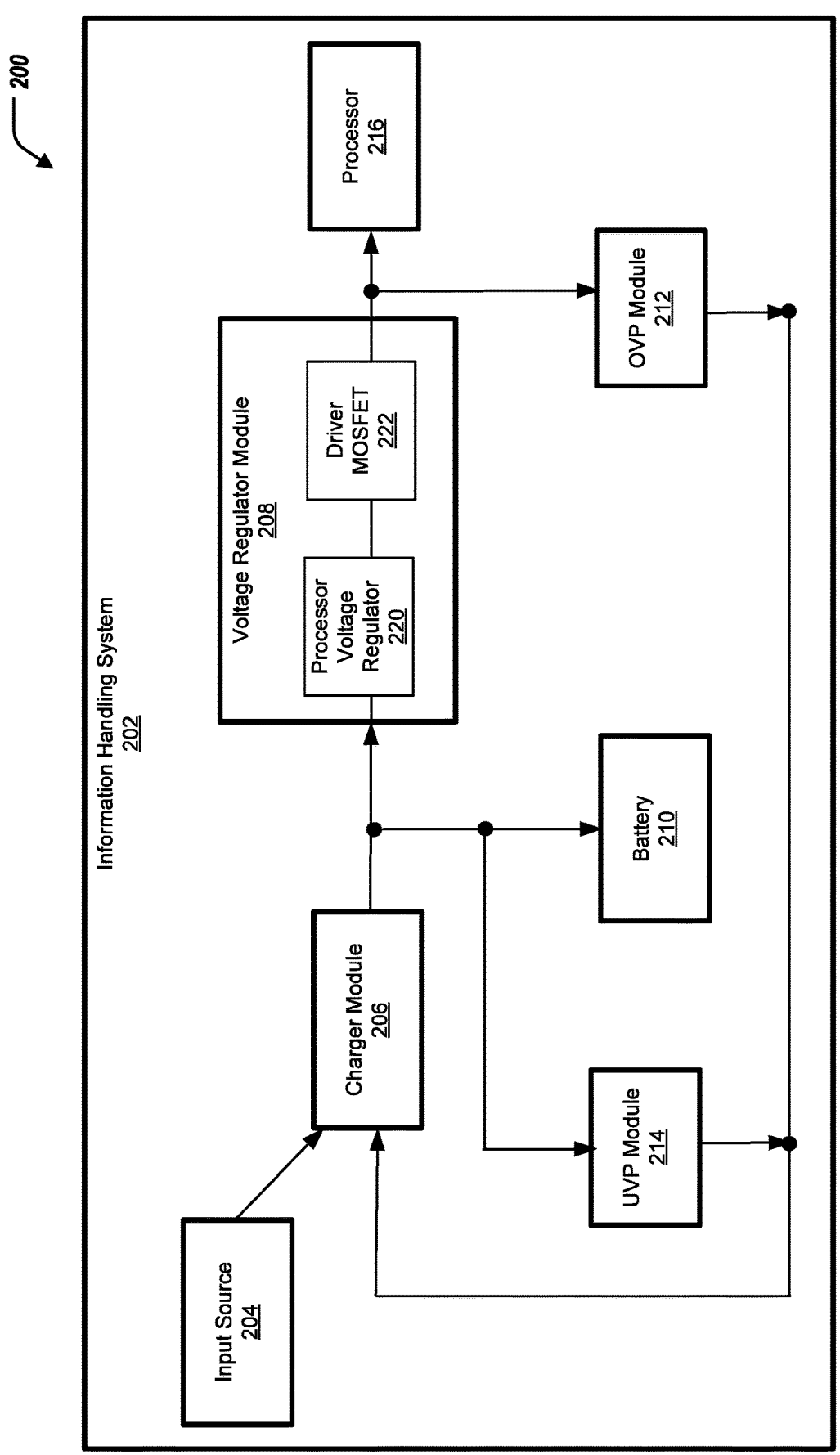
FIGS. 2, 4 illustrates respective block diagrams of the information handling system for controlling the power of a voltage regulator of the information handling system.

Turning to FIG. 2, FIG. 2 illustrates a computing environment 200 including an information handling system 202. The information handling system 202 can include a power input source 204, a charger computing module 206 (or charger module 206), a voltage regulator module 208, a battery 210, an over voltage protection (OVP) module 212, an under voltage protection (UVP) module 214, and a processor 216.

In some examples, the information handling system 202 is similar to, or includes, the information handling system 100 of FIG. 1. In some examples, the charger module 206 can be the same, or substantially similar to, the charger computing module 190 of FIG. 1. In some examples, the processor 216 can be the same, or substantially similar to, the processor subsystem 120 of FIG. 1.

The input source 204 can be coupled to the charger module 206. The charger module 206 can be coupled to the voltage regulator module model 208 and the battery 210. The voltage regulator module 208 can be coupled to the processor 216. The OVP module 212 can be coupled to an output of the voltage regulator module 208. The UVP module 214 can be coupled to an output of the charger module 206. The OVP module 212 and the UVP module 214 can be coupled to the input of the charger module 206.

In short, the information handling system 202, and in particular, the charger module 206, can minimize and/or prevent damage to the processor 216 and other components of the information handling system 202 that result from a faulty or damaged voltage regulator module 208 of the information handling system 202.

Specifically, the charger module 206 is configured to receive power from the power input source 204. In some examples, the power input source 204 can be external to the information handling system 202. The power input source 204 can include a USB power source, a barrel AC adaptor, or similar. The charger module 206 can provide a charger voltage to the battery 210 using the power received from the power input source 204 to charge the battery 210. For example, the charger module 206 can adjust the incoming power ("boost") from a 5-volt source to 11.1 volts and/or can adjust the incoming power ("buck") from 20V to 11.1V. In some examples, the charger module 206 includes a narrow output voltage direct current (NVDC) charger.

The voltage regulator module 208 can be connected between the charger module 206 and the processor 216. The voltage regulator module 208 is configured to receive power from the charger module 206 and provide a regulated voltage to the processor 216 (e.g., a constant voltage level). In some examples, the voltage regulator module 208 is a buck voltage regulator. For example, the voltage regulator module 208 can convert an incoming 11.1 volts to 1 volt (e.g., "buck down" the voltage).

In some examples, the voltage regulator module 208 can include a processor voltage regulator 220 and a driver MOSFET module 222 (DrMOS 222). The processor voltage regulator 220 can receive the power from the charger module 206 and provide the regulated voltage to the driver MOSFET 222. The driver MOSFET 222 can reduce parasitic effects to achieve high switching frequency and improve converter efficiency of the voltage regulator module 208.

Figure 3A:
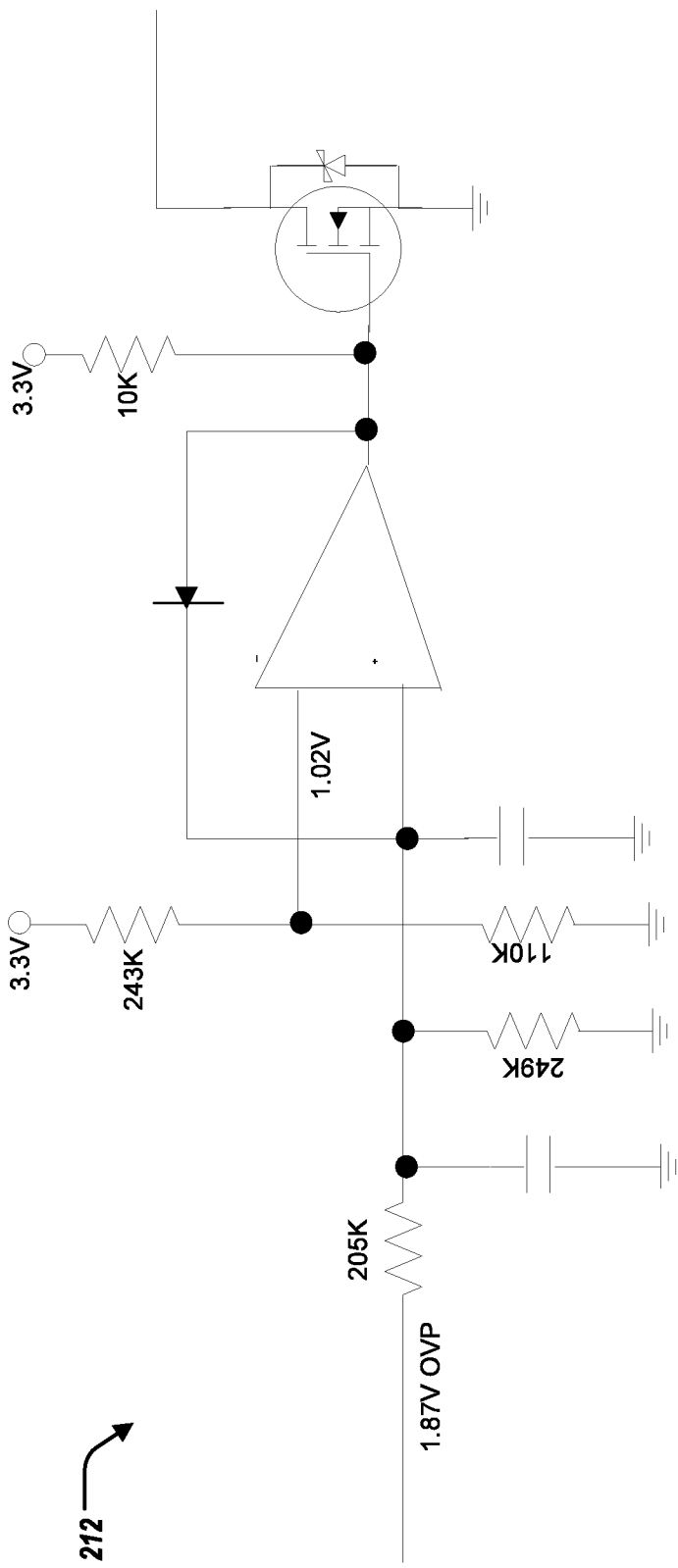
FIG. 3A illustrates a diagram of an example over voltage protection module of the information handling system.

The OVP module 212 is configured to compare the regulated voltage that is output from the voltage regulator module 208 with a first threshold. In some cases, the OVP module 212 can determine that the regulated voltage that is output from the voltage regulator module 208 is above the first threshold. In response to determining that the regulated voltage that is output from the voltage regulator module 208 is above the first threshold, the OVP module 212 can provide a first signal to the charger module 206 that indicates that the regulated voltage (output from the voltage regulator module 208) is above the first threshold. FIG. 3A illustrates a diagram of an example OVP module 212.

In short, the voltage regulator module 208 may enter an over voltage situation—i.e., the regulated voltage output from the voltage regulator module 208 is greater than the first threshold. For example, when the driver MOSFET 222 fails, the regulated voltage that is output from the voltage regulator module 208 can increase to be above the first threshold. In some examples, the first threshold is approximately 2 volts. In some examples, the first threshold is based on a failure voltage of the voltage regulator module 208—e.g., a voltage that results in overheating and/or smoking by the voltage regulator module 208.

Figure 3B:
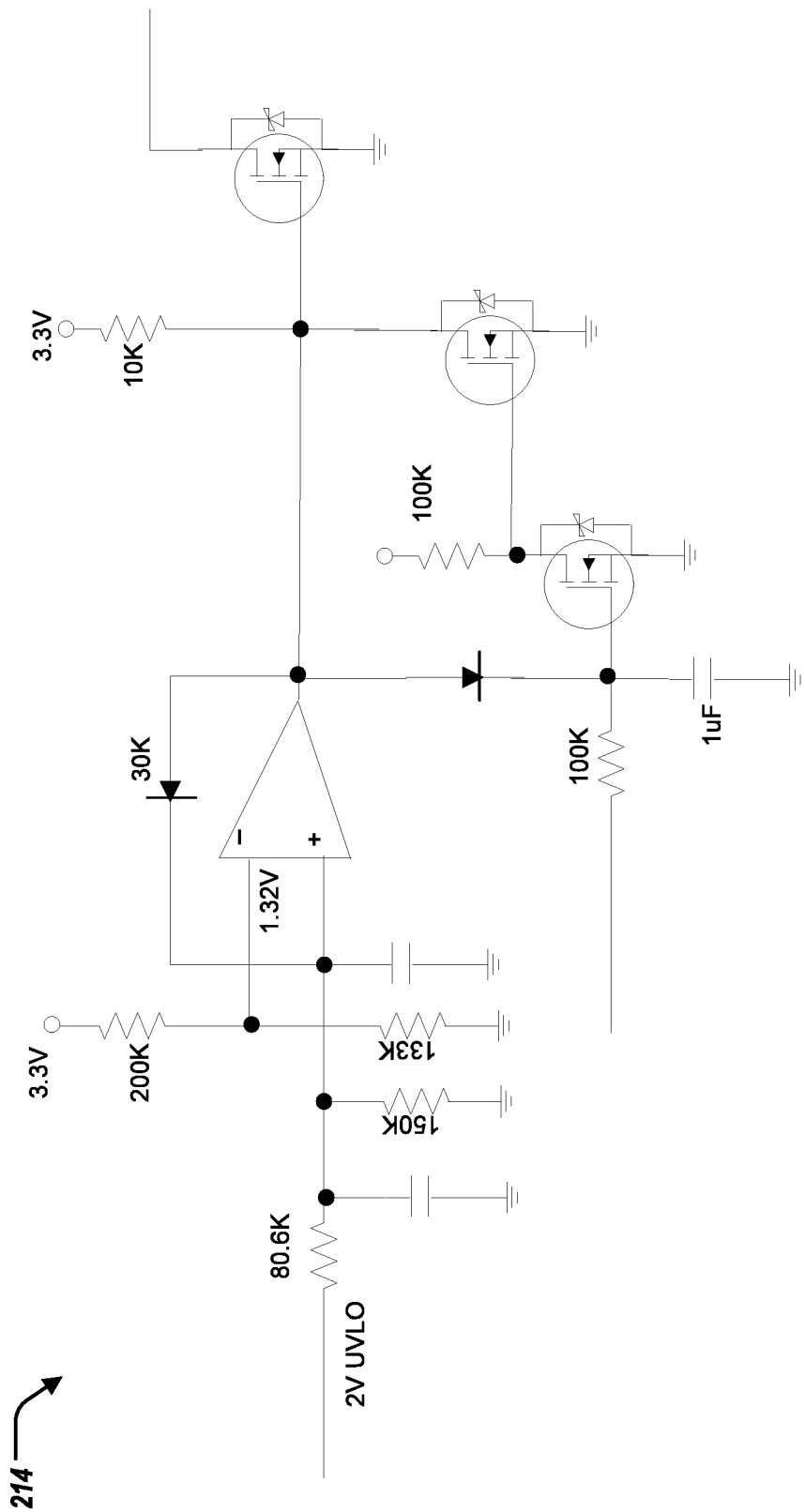
FIG. 3B illustrates a diagram of an example under voltage protection module of the information handling system.

The UVP module 214 is configured to compare the charger voltage that is output from the charger module 206 with a second threshold. In some cases, the UVP module 214 can determine that the charger voltage that is output from the charger module 206 is below a second threshold. In response to determining that the charger voltage that is output from the charger module 206 is below the second threshold, the UVP module 214 can provide a second signal to the charger module 206 that indicates that the charger voltage (output from the charger module 206) is below the second threshold. FIG. 3B illustrates a diagram of an example UVP module 214.

In short, the charger module 206 may enter an under voltage situation—i.e., the charger voltage that is output from the charger module 206 is less than the second voltage. In some examples, the second threshold is based on an operating voltage of the battery 210. For example, the charger voltage output may drop below an expected voltage level for the battery 210. In some examples, the second threshold is approximately 4.8 volts. For example, when the driver MOSFET 222 fails, the charger voltage output from the charger module 206 can decrease to be below the second threshold.

The charger module 206 can receive the first signal from the OVP module 212 and the second signal from the UVP module 214. The charger module 206 can, in response to receiving the first and the second signals, change its power state to an off-power state (from an on-power state). In other words, in response to the OVP module 214 detecting that i) the regulated voltage that is output from the voltage regulator module 208 is above the first threshold and ii) that the charger voltage that is output from the charger module 206 is below the second threshold, the charger module 206 can be latched off. Thus, the voltage regulator module 208 and the processor 216 do not receive power when the charger module 206 is powered down.

As result of the charger module 206 being latched off, and the voltage regulator module 208 being powered off, overheating and/or smoking by the voltage regulator module 208 can be minimized and/or prevented.

Figure 4:
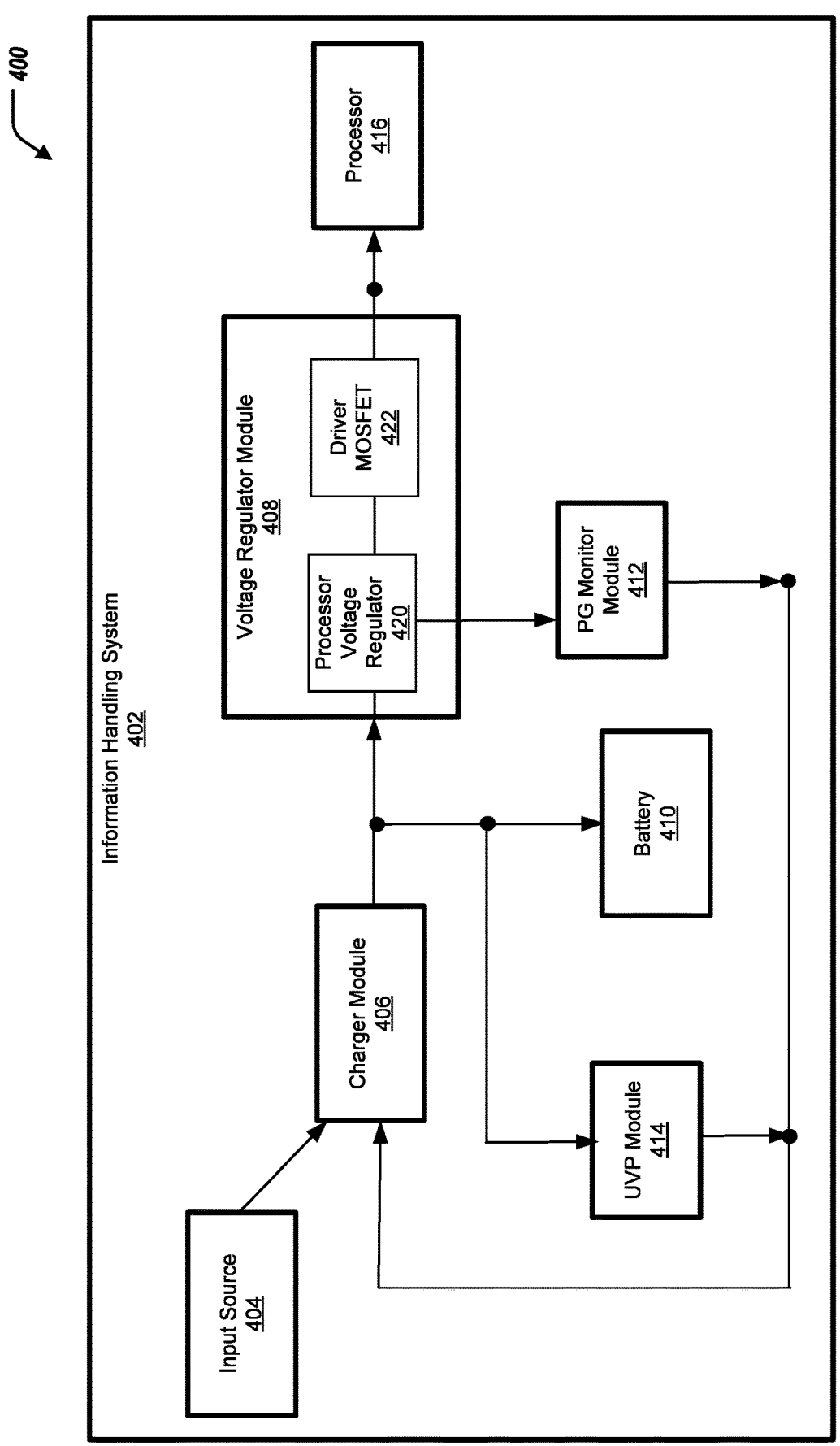

FIG. 4 illustrates a further implementation of the computing environment 200, shown as computing environment 400. The information handling system 402 can include a power input source 404, a charger (computing) module 406, a voltage regulator module 408, a battery 410, a power good (PG) monitor module 412, an under voltage protection (UVP) module 414, and a processor 416.

In some examples, the information handling system 402 is similar to, or includes, the information handling system 100 of FIG. 1. In some examples, the charger module 406 can be the same, or substantially similar to, the charger computing module 190 of FIG. 1. In some examples, the processor 416 can be the same, or substantially similar to, the processor subsystem 120 of FIG. 1.

The input source 404 can be coupled to the charger module 406. The charger module 406 can be coupled to the voltage regulator module model 408 and the battery 410. The voltage regulator module 408 can be coupled to the processor 416. The OVP module 412 and the UVP module 414 can be coupled to the input of the charger module 406.

In short, the information handling system 402, and in particular, the charger module 406, can minimize and/or prevent damage to the processor 416 and other components of the information handling system 402 that result from faulty or damaged power components of the information handling system 402.

Specifically, the charger module 406 is configured to receive power from the power input source 404. In some examples, the power input source 404 can be external to the information handling system 402. The power input source 404 can include a USB power source, a barrel AC adaptor, etc. The charger module 406 can provide a charger voltage to the battery 410 using the power received from the power input source 404 to charger the battery 410. For example, the charger module 406 can adjust the incoming power ("boost") from a 5-volt source to 11.1 volts. In some examples, the charger module 406 includes a narrow output voltage direct current (NVDC) charger.

The voltage regulator module 408 can be connected between the charger module 406 and the processor 416. The voltage regulator module 408 is configured to receive power from the charger module 406 and provide a regulated voltage to the processor 416 (e.g., a constant voltage level). In some examples, the voltage regulator module 408 is a buck voltage regulator. For example, the voltage regulator module 408 can convert an incoming 11.1 volts to 1 volt (e.g., "buck down" the voltage).

In some examples, the voltage regulator module 408 can include a processor voltage regulator 420 (and/or processor chipset voltage regulators 420—i.e., multiple voltage regulators) and a driver MOSFET module 422 (DrMOS 422). The processor voltage regulator 420 can receive the power from the charger module 406 and provide the regulated voltage to the driver MOSFET 422. The driver MOSFET 422 can reduce parasitic effects to achieve high switching frequency and improve converter efficiency of the voltage regulator module 408.

The PG monitor module 412 can be coupled to an output of the processor voltage regulator 420. The PG monitor module 412 is configured to detect a presence of a power good (PG) signal that is output from the processor voltage regulator 420. The PG signal can indicate whether the voltage level of the voltage regulator module 408 is stable—e.g., within a desired voltage specification.

In some cases, the PG monitor module 412 can determine that the PG signal that is output from the processor voltage regulator 420 (and/or processor chipset voltage regulators 420—i.e. multiple voltage regulators) is not within a desired specification. In response to determining that the PG signal that is output is not within the desired specification, the PG monitor module 412 can provide a third signal to the charger module 406 that indicates that the PG signal is not within the desired specification.

The UVP module 414 can be coupled to an output of the charger module 406. The UVP module 414 is configured to compare the charger voltage that is output from the charger module 406 with a second threshold. In some cases, the UVP module 414 can determine that the charger voltage that is output from the charger module 406 is below a second threshold. In response to determining that the charger voltage that is output from the charger module 406 is below the second threshold, the UVP module 414 can provide a second signal to the charger module 406 that indicates that the charger voltage (output from the charger module 406) is below the second threshold.

In short, the charger module 406 may enter an under voltage situation—i.e., the charger voltage that is output from the charger module 406 is less than the second voltage. In some examples, the second threshold is based on an operating voltage of the battery 410. For example, the charger voltage output may drop below an expected voltage level for the battery 410. In some examples, the second threshold is approximately 4.8 volts. For example, when the driver MOSFET 422 fails, the charger voltage output from the charger module 406 can decrease to be below the second threshold.

The charger module 406 can receive the third signal from the PG monitor module 412 and the second signal from the UVP module 414. The charger module 406 can, in response to receiving the third and the second signals, change its power state to an off-power state (from an on-power state). In other words, in response to the PG monitor module 414 detecting that i) the PG signal that is output from the processor voltage regulator 420 (and/or processor chipset voltage regulators 420—i.e. multiple voltage regulators) is not within the desired specification and ii) that the charger voltage that is output from the charger module 406 is below the second threshold, the charger module 406 can be latched off. Thus, the voltage regulator module 408 and the processor 416 do not receive power when the charger module 406 is powered down.

As result of the charger module 406 being latched off, and the voltage regulator module 408 being powered off, overheating and/or smoking by the voltage regulator module 408 can be minimized and/or prevented.

Figure 5:
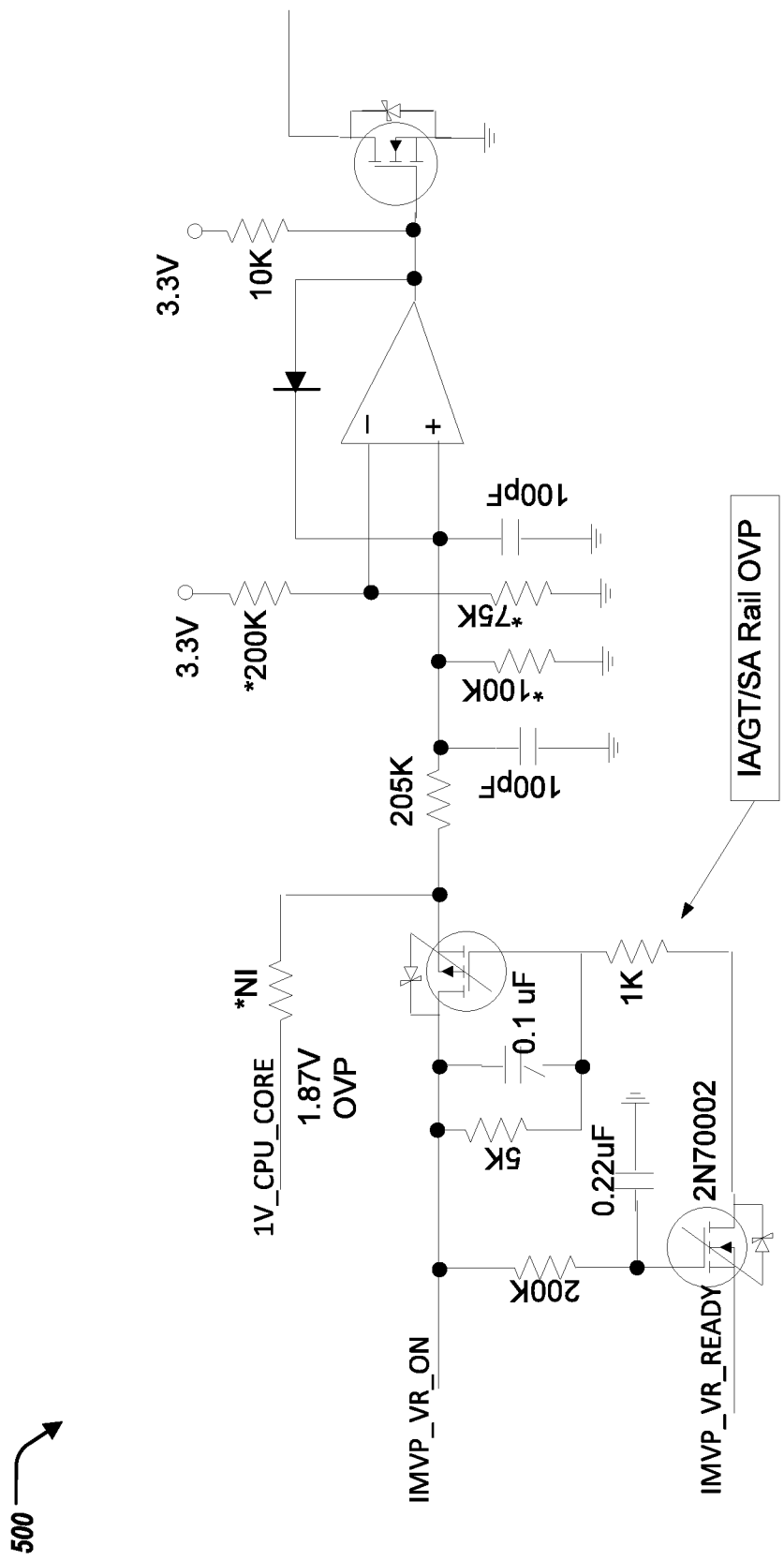
FIG. 5 illustrate a diagram of a Power Good protection module for latching off a power source for multiple voltage regulators.

FIG. 5 illustrates a circuit diagram 500 for an OVP module for latching off a power source (e.g., the charger modules 206, 406) for multiple voltage regulators (e.g., voltage regulator modules 208, 408) by leveraging the power good signal of the voltage regulator. Circuit diagram 500 can latch off the charger modules when the power good signal is normally expected to be asserted as the power rails can routinely power up/power down in normal use. Thus, the power good latch is conditional and set to detect fault only in conditions when the power good signal is expected to be high. Further, the circuit diagram 500 does not latch off in normal, power good assertion/desertion.

Figure 6:
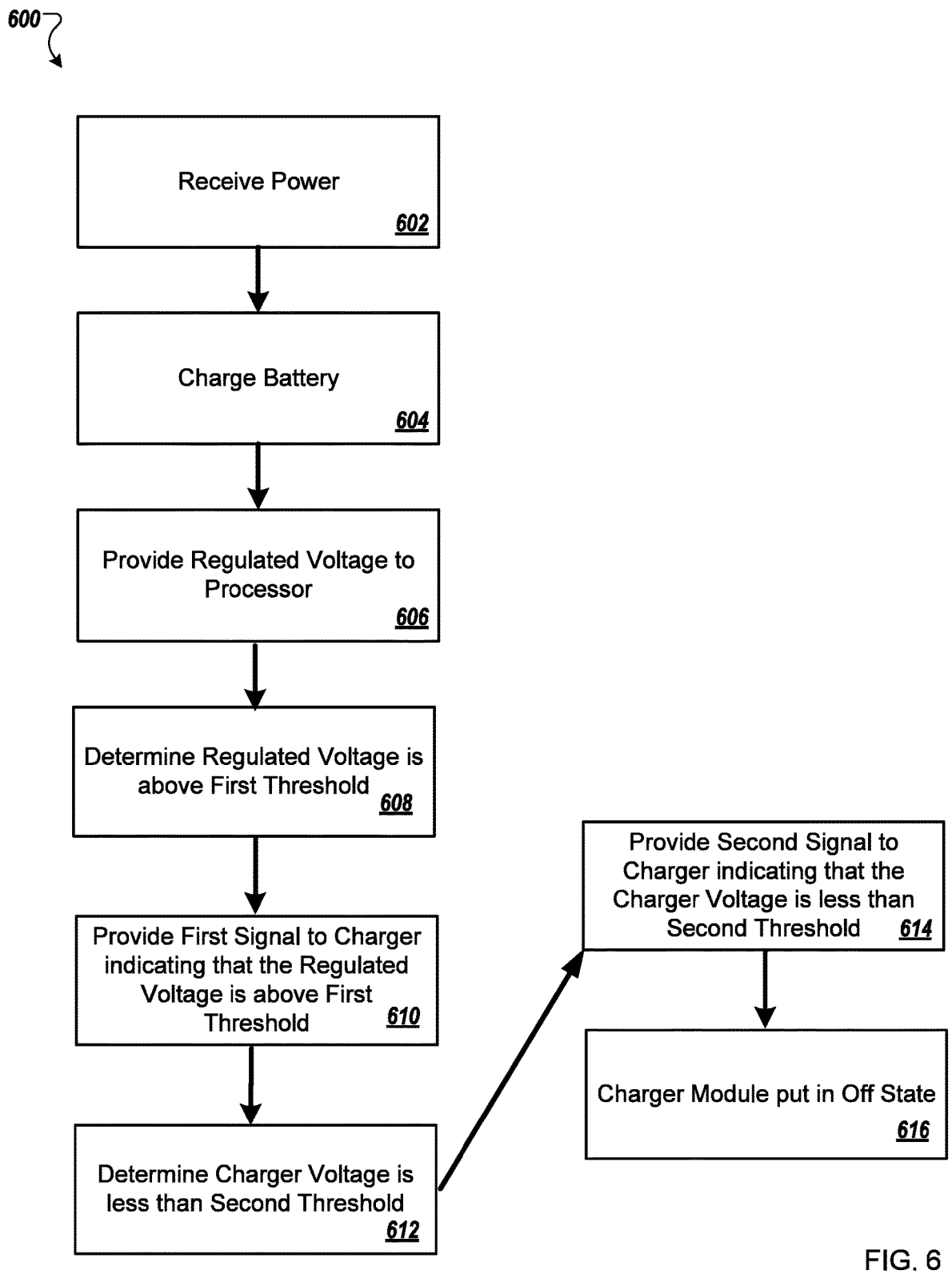
FIG. 6 illustrates a flowchart for a method for controlling the power of the charger module and the voltage regulator of the information handling system.

FIG. 6 illustrates a flowchart depicting selected elements of an embodiment of a method 600 for managing power of a voltage regulator and an information handling system. The method 600 may be performed by the information handling system 100, the computing environment 200, the information handling system 202, the computing environment 400, and/or the information handling system 402, and with reference to FIGS. 1-5. It is noted that certain operations described in method 600 may be optional or may be rearranged in different embodiments.

The charger module 206 receives power from the input source 204 (602). The charger voltage is provided by the charger module 206 to the battery 210 using the power received from the input source 204 (604). The voltage regulator 208 provides the regulated voltage to the processor 216 (606). The OVP module 212 determines that the regulated voltage is above a first threshold (608). The OVP module 212 provides a first signal to the charger module 206 indicating that the regulated voltage is above the first threshold (610). The UVP module 214 determines that the charger voltage is below the second threshold (612). The UVP module 214 provides a second signal to the charger module 206 indicating that the charger voltage is below the second threshold (614). The charger module 606, in response to the first and the second signals, adjusts to an off power state (616).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An information handling system, comprising:
   a processor;
   a battery;
   a charger receiving power from a power source and providing a first voltage i) to the battery to charge the battery, and ii) to a voltage regulator;
   the voltage regulator connected between the charger and the processor, the voltage regulator receiving power from the charger module and providing a regulated second voltage to the processor, wherein the battery is coupled between the charger and the voltage regulator;
   an over voltage protection (OVP) circuit determining that the regulated second voltage output from the voltage regulator and provided to the processor is above a first threshold, and in response, providing a first signal to the charger to indicate that the regulated second voltage is above the first threshold; and an under voltage protection (UVP) circuit determining that the first voltage output from the charger and provided to the battery is below a second threshold, and in response, providing a second signal to the charger indicating that the first voltage is below the second threshold, wherein the charger, in response to receiving both the first signal indicating that the regulated second voltage is above the first threshold and the second signal indicating that the first voltage is below the second threshold and the second threshold being greater than the first threshold, changes to an off power state.

2. The information handling system of claim 1, wherein the second threshold is based on an operating voltage of the battery.

3. The information handling system of claim 1, wherein the second threshold is approximately 4.8 volts.

4. The information handling system of claim 1, wherein the first threshold is approximately 2 volts.

5. The information handling system of claim 1, wherein the voltage regulator is a buck voltage regulator.

6. The information handling system of claim 1, wherein the charger includes a narrow output voltage DC (NVDC) charger.

7. The information handling system of claim 1, wherein the voltage regulator does not receive power when the charger powers down.

8. A computer-implemented method for managing power at an information handling system, comprising:

receiving, at a charger, power from a power source external to the information handling system;

providing, by the charger, a first voltage to a battery of the information handling system using the power received from the external power source to charge the battery, and ii) to a voltage regulator connected between the charger and a processor of the information handling system;

providing, by the voltage regulator, a regulated second voltage to a processor of the information handling system using power received from the external power source, wherein the battery is coupled between the charger and the voltage regulator, wherein the voltage regulator is coupled between the charger and the processor;

determining that the regulated second voltage output from the voltage regulator and provided to the processor is above a first threshold, and in response, providing a first signal to the charger module indicating that the regulated second voltage is above the first threshold;

determining that the first voltage output from the charger and provided to the battery is below a second threshold, and in response, providing a second signal to the charger indicating that the first voltage is below the second threshold, wherein the second threshold is greater than the first threshold; and in response to both the first signal indicating that the regulated second voltage is above the first threshold and the second signal indicating that the first voltage is below the second threshold and the second threshold being greater than the first threshold, changing the charger to an off power state.

9. The method of claim 8, wherein the second threshold is based on an operating voltage of the battery.

10. The method of claim 8, wherein the second threshold is approximately 4.8 volts.

11. The method of claim 8, wherein the first threshold is approximately 2 volts.

12. The method of claim 8, wherein the voltage regulator is a buck voltage regulator.

13. The method of claim 8, wherein the charger includes a narrow output voltage DC (NVDC) charger.

14. The method of claim 8, wherein the voltage regulator does not receive power when the charger powers down.

* * * * *